Figure 1:
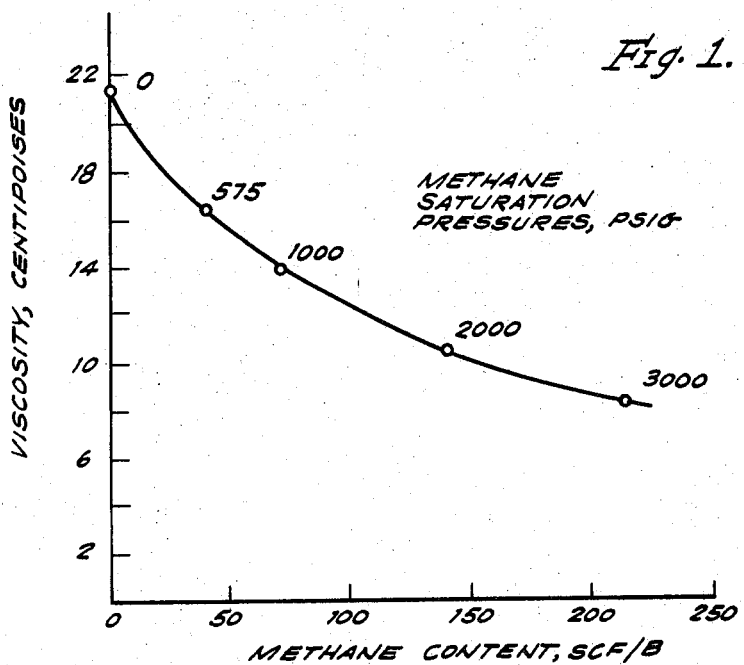

United States Patent [19]

Holm

[11] 3,830,301

[45] Aug. 20, 1974

[54] MISCIBLE FLOODING PROCESS USING METHANE-ENRICHED SOLUBLE OIL

[75] Inventor: Leroy W. Holm, Fullerton, Calif.

[73] Assignee: Union Oil Company of California, Los Angeles, Calif.

[22] Filed: Nov. 16, 1972

[21] Appl. No.: 307,128

[52] U.S. Cl. .............................................. 166/274
[51] Int. Cl. ........................................... E21b 43/20
[58] Field of Search .................... 166/271, 273, 274

[56] References Cited
UNITED STATES PATENTS

| | | | |
|---|---|---|---|
| 2,880,801 | 4/1959 | Crump | 166/274 X |
| 3,269,460 | 8/1966 | Hardy et al. | 166/274 |
| 3,500,919 | 3/1970 | Holm | 166/274 X |
| 3,557,873 | 1/1971 | Owens | 166/274 |
| 3,691,072 | 9/1972 | Holm | 166/274 |

Primary Examiner—Ernest R. Purser
Attorney, Agent, or Firm—Dean Sanford

[57] ABSTRACT

A miscible flooding process for the recovery of oil from subterranean reservoirs in which a methane-enriched soluble oil is injected into the reservoir through one or more injection wells at a pressure above the bubble point pressure of the composition, and thereafter an aqueous flooding agent is injected to drive the soluble oil towards a spaced production well. The soluble oil comprises an admixture of a liquid hydrocarbon, surface active organic sulfonates, and a stabilizing agent; and is enriched by the addition of methane in an amount not exceeding the saturation composition at reservoir conditions of temperature and pressure. The soluble oil can be substantially anhydrous, or it can contain water present as a water-in-oil microemulsion.

13 Claims, 2 Drawing Figures

MISCIBLE FLOODING PROCESS USING METHANE-ENRICHED SOLUBLE OIL

This invention relates to the recovery of oil from subterranean petroleum reservoirs, and more particularly to an improved miscible flooding process for the recovery of petroleum.

It has long been recognized that substantial amounts of oil remain unrecovered in the reservoir at the completion of normal primary recovery operations. Hence, various secondary methods of recovering additional quantities of oil have been proposed, such as a well known technique of water flooding in which water is injected into the reservoir through an injection well to drive additional oil toward one or more production wells spaced apart in the reservoir from the injection well. Although an additional quantity of oil can often be recovered by waterflooding, the efficiency of the waterflood and the ultimate oil recovery can be further improved by introducing a solvent that is miscible with both the connate oil and with the flood water into the reservoir ahead of the flood water.

It is known that both substantially anhydrous soluble oil and soluble oils containing water present in the form of a water-in-oil microemulsion can be employed as the solvent in a miscible-flood water drive process. These soluble oils are generally admixtures of a liquid hydrocarbon, one or more surface active agents, and a stabilizing agent, and can contain water in an amount up to the concentration at which the water-in-oil microemulsion inverts to an oil-in-water emulsion. A wide variety of liquid hydrocarbons such as liquefied petroleum gas (LPG), gasoline, mineral oil, lubricating oil, lubricating oil extract and other refinery byproduct oils, crude petroleum, and the like, can be employed as the liquid hydrocarbon base. In many applications, it is preferred to employ crude petroleum as the hydrocarbon base component.

In a fluid displacement operation such as encountered in a miscible-flood water drive process conducted in a permeable earth formation, it is advantageous to adjust the mobility of the drive fluid to not exceed that of the displaced fluid. However, it has been found that soluble oils, even when prepared from low viscosity hydrocarbons such as LPG or gasoline generally exhibit viscosities exceeding that of the connate oil. Although these soluble oils have a satisfactory low mobility ratio between the connate oil and the soluble oil providing efficient displacement of the connate oil, the mobility of the subsequently injected flood water must be reduced to obtain good displacement of the soluble oil by the drive water. While the mobility of the flood water can be adjusted by the addition of water-soluble polymers and other viscosity increasing agents, it becomes costly, and in some cases impossible, to sufficiently increase the viscosity of the flood water to achieve a desirable mobility ratio between the soluble oil and the subsequently injected flood water. This problem is further complicated by the fact that most soluble oils increase in viscosity on taking up water in the reservoir.

U.S. Pat. No. 3,163,214 recognizes this problem and proposes that the soluble oil be admixed with a low viscosity, nonaqueous solvent to reduce the viscosity of the mixture to a value approximating that of the petroleum to be recovered. Suitable solvents include low-molecular weight hydrocarbon fractions, especially those principally comprising hydrocarbons having fewer than about 10 carbon atoms per molecule. Partially oxygenated, low molecular weight hydrocarbons, such as alcohols having not in excess of about four carbon atoms per molecule, and especially isopropyl alcohol are preferred. Also suitable are low-molecular weight ketones, aldehydes, and organic acids, of which acetone and methyl ethyl ketone are preferred examples. The oxygenated hydrocarbon solvent preferably has a very substantial solubility in both oil and water. However, solubility in water is not an essential characteristic, and low viscosity hydrocarbons may be used as the solvent employed to reduce the viscosity of the soluble oil.

However, while the viscosity of the soluble oil can be effectively reduced by incorporating a low viscosity solvent into the soluble oil, these solvents are generally relatively costly and require the handling of an additional ingredient that is not usually available in the oil fields. The use of such material becomes even more costly when the recovery operation is conducted in a reservoir located in a remote area. Thus, need exists for a simple, inexpensive method for adjusting the mobility of the soluble oil to provide a miscible displacement fluid having a mobility approximating that of the connate reservoir oil.

Accordingly, a principal object of this invention is to provide an improved miscible flooding process for the recovery of petroleum from subterranean reservoirs.

Another object of the invention is to provide a miscible flooding process in which an improved miscible displacement fluid is injected into an oil-bearing reservoir and thereafter driven through the reservoir by flood water.

Still another object of the invention is to provide a simple and economic method for controlling the mobility of substantially anhydrous and water-containing soluble oils employed as miscible displacement fluids in recovering oil from permeable subterranean reservoirs.

A further object of the invention is to provide a method for reducing the viscosity of substantially anhydrous and water-containing soluble oils injected into permeable subterranean reservoirs to promote the recovery of oil therefrom.

Other objects and advantages of the invention will be apparent from the following description.

Briefly, this invention contemplates a process for recovering oil from subterranean reservoirs in which a methane-enriched soluble oil composition comprising a liquid hydrocarbon, surface active organic sulfonates, and a stabilizing agent is injected into the reservoir through an injection well at a pressure above the bubble point pressure of the composition, and thereafter an aqueous flooding agent is injected to drive the soluble oil composition towards a spaced production well from which fluids are recovered. The soluble oil can be injected into the reservoir as a substantially anhydrous liquid, or it can be injected as a water-in-oil microemulsion. In either case, it has been found that soluble oils compounded in accordance with this invention exhibit lower viscosities and higher mobilities in the reservoir than comparable soluble oils which are not methane enriched. Also, it has been found that methane-enriched soluble oils can absorb more water before inversion to oil-in-water emulsions, and that improved oil recovery is attained when methane-enriched soluble oils are used in a miscible flooding process.

Figure 2:
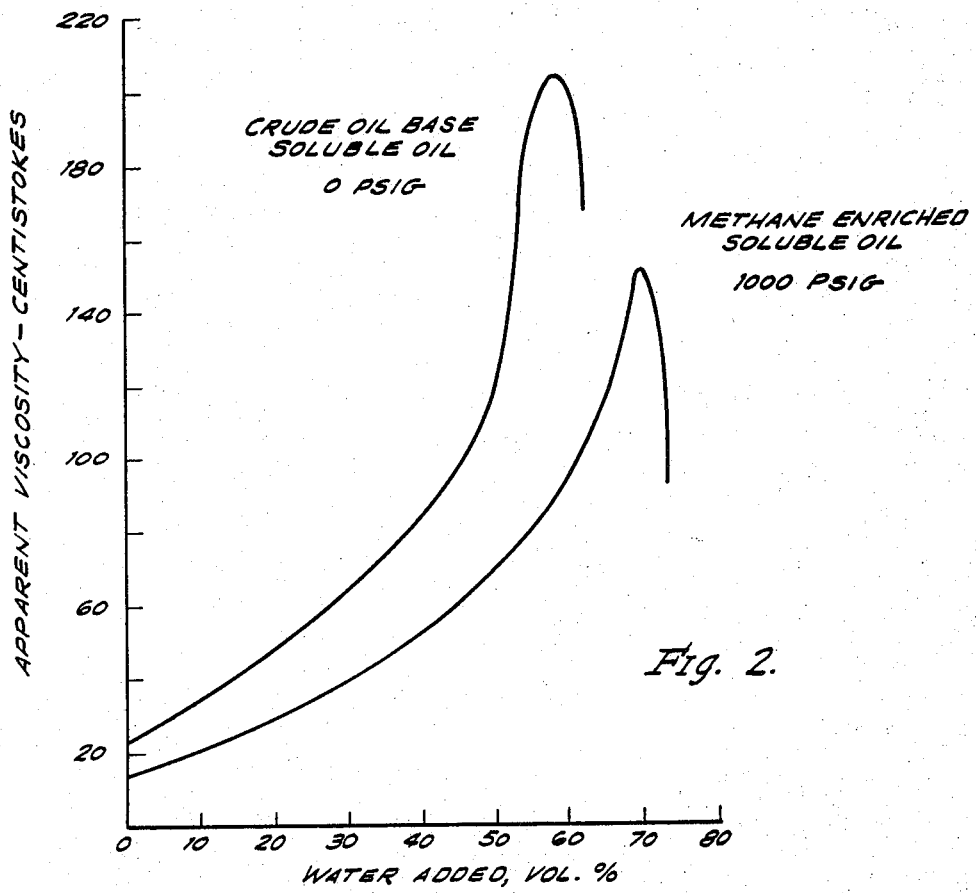

The invention will be more readily understood by reference to the accompanying drawings, wherein:

FIG. 1 is a graph showing the viscosity of a typical methane-enriched soluble oil as a function of methane content; and FIG. 2 is a graph showing the viscosities of both a conventional soluble oil and a methane-enriched soluble oil as a function of water content as determined in Example 1.

More specifically, this invention involves a flooding process in which oil is displaced from a subterranean oil-bearing reservoir by a methane-enriched soluble oil composition. In the practice of this invention, a slug of the methane-enriched soluble oil in the form of a substantially anhydrous liquid or a water-in-oil microemulsion is injected into the reservoir through one or more injection or input wells penetrating the oil-bearing formation and forced through the reservoir by subsequently injected flood water toward at least one production or output well similarly completed in the reservoir. As the flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front; such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

One of the major constituents of the soluble oils used in the practice of this invention is a liquid hydrocarbon. The particular liquid hydrocarbon employed in formulating the soluble oil in part determines the viscosity and other properties of the soluble oil, and the mobility of the soluble oil in the reservoir, which affect the efficiency of the oil recovery process. Broadly, methane enrichment can be beneficially practiced with any soluble oil having a viscosity above that of the connate oil in the reservoir. The soluble oils exhibiting viscosities substantially higher than the connate oil are generally formulated with liquid hydrocarbons having viscosities above about 0.5 centipoises at 75° F., exemplary of which are crude petroleum, such as crude petroleum previously recovered from the reservoir, or other conveniently available crude oil; distillate petroleum fractions such as refined or semi-refined petroleum products, such as stove oil, diesel and gas oil; residual products obtained by the distillation of lower boiling fractions from a crude oil, such as bunker fuel oil and other residual products; and low value refinery by-products, such as catalytic cycle oil, lube oil extract, and the like. While soluble oils can be prepared from any of these hydrocarbon materials, in many applications it is preferred to employ methane-enriched soluble oils compounded with crude petroleum, and particularly with crude petroleum having a viscosity above about 1 centipoise at 75° F.

Surface active materials which can be used are those that when admixed with the liquid hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials possessing the ability to spontaneously emulsify water in oil exhibit average HLB numbers of 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water-soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention is the oil-soluble alkyl aryl sulfonates that contain only one sulfonic group attached to an alkyl aryl hydrocarbon. The preferentially oil-soluble alkyl aryl sulfonates are those which in the form of their sodium salts have average molecular weights of more than about 400. Among the preferred preferentially oil-soluble organic sulfonates are alkyl sodium benzene sulfonates and alkyl sodium polyaryl sulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have average molecular weights of less than about 400 or which contain more than one sulfonic acid group per molecule, i.e., the preferred water-soluble sulfonates are monosulfonates or polysulfonates which in the form of their sodium salts have average equivalent weights of less than about 400. It has been found that in soluble oils compounded from petroleum crude oil or other high boiling hydrocarbons, superior results are obtained by employing as the preferentially oil-soluble organic sulfonate an alkyl aryl sulfonate which in the form of its sodium salt has an average molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl sulfonate or mixture of sulfonates which in the form of their sodium salts have average molecular weights of more than about 400, and a preferentially water-soluble organic sulfonate, such as an alkyl aryl monosulfonate or mixture of monosulfonates which in the form of their sodium salts have molecular weights of less than about 400 or such as polysulfonates having average equivalent weights of less than about 400. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500 and which includes both preferentially oil-soluble and preferentially water-soluble sulfonates.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "natural petroleum sulfonates" is a commercial designation of petroleum sulfonates which are obtained by a treatment of petroleum fractions, particularly solvent treated aromatic fractions, with sulfuric acid, fuming sulfuric acid or sulfur trioxide. Upon sulfonation, two types of general products are formed which are designated mahogany acid sulfonates and green acid sulfonates. The terminology is based on the colors imparted to the sulfonates in solution, a brownish color being imparted to the sulfonates which remain in the oil and the greenish color imparted to aqueous solutions made from the acid sludges formed in the sulfonation process. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 15 parts of oil-soluble agent per part of water soluble agent, or more preferably to about 12 parts of oil-soluble agent per part of water-soluble agent. That is, the soluble oil compositions of this invention contain between about 1 to 15, or 1 to 12 parts of preferentially oil-soluble sulfonate per part of preferentially water-soluble sulfonate. Although the optimum surfactant combination is dependent upon the characteristics of the particular reservoir, in many operations it is found that superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated hydrocarbons such as monohydric and polyhydric alcohols, ketones, ethers, and polyhydric alkyl ethers. More specifically, the stabilizing agents are monohydric aliphatic alcohols having three to five carbon atoms, dihydric aliphatic alcohols containing two to three carbon atoms, aliphatic ketones containing four to six carbon atoms, glycol ethers containing four to 10 carbon atoms, and dialkylene glycols containing four to six carbon atoms. Exemplary monohydric alcohols include propyl alcohol, isopropyl alcohol, n-butyl alcohol, isobutyl alcohol, secondary butyl alcohol, tertiary butyl alcohol, normal amyl alcohol and secondary amyl alcohol. Exemplary polyhydric aliphatic alcohols include ehtylene glycol, 1,3-propanediol and 1,2-propanediol. Exemplary aliphatic ketones include methyl ethyl ketone, diethyl ketone and methyl isobutyl ketone. Exemplary glycol ethers include ethylene glycol monoethyl ether (Cellosolve solvent), ethylene glycol monobutyl ether (butyl Cellosolve solvent), diethylene glycol monobutyl ether (butyl Carbitol solvent), diethylene glycol monoethyl ether (Carbitol solvent), diethylene glycol hexyl ether (hexyl Carbitol solvent) and ethylene glycol hexyl ether (hexyl Cellosolve solvent). The terms "Cellosolve" and "Carbitol" are trademarks of the Union Carbide Corporation. Exemplary dialkylene glycols include diethylene glycol and dipropylene glycol. Specific agents found particularly useful include isopropyl alcohol, secondary butyl alcohol, methyl ethyl ketone, ethylene glycol monoethyl ether, ethylene glycol monobutyl ether, diethylene glycol monobutyl ether, and diethylene glycol hexyl ether.

The soluble oils useful in the practice of this invention can be prepared by any of the conventional techniques. One suitable method is to prepare a substantially anhydrous soluble oil by admixing the hydrocarbon base stock, the stabilizing agent and the preferentially oil-soluble surface active material. Thereafter, the preferentially water-soluble surface active material, if used, is added. Water-in-oil microemulsions can be prepared by simply adding a desired amount of water to the substantially anhydrous soluble oil. Preferably, the water employed in forming the microemulsion is a salt-containing fresh water having a dissolved salt content of less than about 15,000 ppm, and more preferably less than about 5,000 ppm. Water-soluble salts of a monovalent metal can be added to obtain a water having a desired salt content.

The compositions useful in the practice of this invention comprise a mixture of about 45 to 90 volume percent of liquid hydrocarbon, such as crude petroleum; 0.5 to 8 volume percent of stabilizing agent, such as one of the above-described partially oxygenated organic liquids, or a mixture of these liquids; and 4 to 30 volume percent of surface active materials, and preferably surface active materials containing both preferentially oil-soluble and preferentially water-soluble organic sulfonates in the previously disclosed proportions. This composition can also contain water present as a water-in-oil microemulsion in an amount up to that amount causing inversion to an oil-in-water emulsion, which is typically at least about 50 volume percent. The soluble oil compositions of the invention can also comprise 45 to 75 volume percent of liquid hydrocarbon, 3 to 8 volume percent of stabilizing agent, 8 to 30 volume percent of combined surface active materials containing both preferentially oil and water-soluble organic sulfonate surface active materials in the previously disclosed proportions, and 0 to 40 percent of water.

The soluble oil prepared in the foregoing manner can be enriched by admixture with methane at an elevated pressure. Methane enrichment can be accomplished on the surface by admixing the soluble oil and the methane in a pressure vessel maintained at a pressure elevated sufficiently to dissolve a desired quantity of methane in the soluble oil. The methane-enriched soluble oil is then injected into the reservoir through one or more injection wells in an amount sufficient to establish in the reservoir a bank which can be displaced through the reservoir. Satisfactory oil recoveries can usually be obtained by the injection of 0.01 to 0.15 reservoir pore volume of the methane-enriched soluble oil. Alternatively, in many cases it is preferred that both the soluble oil and the methane be simultaneously or alternately injected into the well so that the methane is dissolved in the soluble oil in the well or in the reservoir adjacent to the well. It is preferred that the amount of methane dissolved in the reservoir does not exceed the concentration at which substantially all of the methane at the displacement front will remain dissolved under reservoir conditions of temperature and pressure.

Methane is typically available in the oil fields in the form of produced gas and in the form of natural gas that has been treated to remove some of the higher molecular weight hydrocarbon constituents. Preferably, a natural gas containing at least about 90 mol percent methane is employed, although it is to be recognized that gases containing less than about 90 mol percent methane can also be utilized.

Aqueous flooding medium is then injected to displace the soluble oil toward at least one production well spaced apart in the reservoir, from which fluids are produced in conventional manner. The aqueous flooding medium can comprise water or brine, and can be made more viscous by the addition of a thickening agent such as sugar, dextran, carboxymethyl cellulose, amines, glycerine, guar gum and mixtures of these agents. Also, the aqueous flooding medium can be rendered more viscous by the addition of a small amount of a water-soluble polymer, such as a polyacrylamide, and particularly a partially hydrolyzed polyacrylamide. In a preferred method of practicing this invention, thickening agent is added to only an initial portion of the flood water. Thus, in this embodiment, 0.01 to 0.15 reservoir pore volume of methane-enriched soluble oil is injected into the reservoir and followed by 0.1 to 0.8 reservoir pore volume of thickened aqueous flooding medium. Thereafter, water or brine is injected to drive the previously injected fluids toward at least one spaced production well.

In one preferred mode of practicing the invention, 0.01 to 0.15 pore volume of substantially anhydrous methane-enriched soluble oil is injected into the formation and followed directly by the injection of low salt-content water in an amount not exceeding the volume of soluble oil injected, or these fluids are injected as a series of alternate slugs of substantially anhydrous methane-enriched soluble oil and low salt-content water. The injected fluids are displaced through the formation by injecting a substantially larger volume of thickened aqueous flooding medium followed by flood water or brine.

The term "low salt-content water" is meant to include fresh water having a low salt-content, and more particularly, fresh water having less than 1.0 weight percent total dissolved salts. Further, it is preferred that the low salt-content water contain less than 0.6 weight percent (6,000 parts per million) of total dissolved salts. Also, the salts of polyvalent metals, such as calcium and magnesium, are particularly detrimental and it is preferred that the low salt-content water have low contents of salts of polyvalent metals. In particular, it is preferred that this water contain less than 0.1 weight percent (1,000 ppm) salts of polyvalent metals, and more preferably, less than 0.01 weight percent (100 ppm) of these salts.

The term "substantially anhydrous" as used herein is meant to include soluble oils having not more than minor amounts of water. More particularly, these soluble oils contain less than 10 volume percent of water, and preferably less than about 5 volume percent. Some of the ingredients from which the substantially anhydrous soluble oils are compounded, such as the liquid hydrocarbon, the stabilizing agent, and the petroleum sulfonates, can contain minor proportions of water, and it is difficult and costly to dehydrate these agents to remove all traces of water. Also, it may be advantageous when compounding the soluble oil to add a small amount of water to the composition. These substantially anhydrous soluble oils are to be distinguished from the high water-content microemulsions containing substantial quantities of water as from 10 to 50 percent or more.

The amount of methane that can be dissolved in a soluble oil depends upon the composition of the soluble oil and the reservoir temperature and pressure. It is preferred that the soluble oil be maintained as a liquid phase in the reservoir, and that vaporization of the methane be avoided. Hence, the pressure to which the methane-enriched soluble oil is subjected should be maintained above the bubble point pressure of the mixture to insure that the desired amount of methane is dissolved in the soluble oil, and that the methane-enriched soluble oil remains in the liquid phase. The maximum amount of methane that can be dissolved in a particular soluble oil is limited by reservoir conditions of temperature and pressure. The maximum amount of methane that can be dissolved in one substantially anhydrous soluble oil at 75° F. and various pressures and the viscosity of the methane-enriched soluble oil are reported in Table 1 and graphically illustrated in FIG. 1.

TABLE 1

SOLUBILITY OF METHANE IN A SOLUBLE OIL

| Saturation Pressure, Psig | Methane Added, SCF/BBL | Viscosity, cp |
|---|---|---|
| 0 | 0 | 21.4 |
| 575 | 41 | 16.4 |
| 1000 | 72 | 14.0 |
| 2000 | 140 | 10.4 |
| 3000 | 215 | 8.1 |

The "saturation pressure" or "bubble point pressure" is defined as the minimum pressure at which a methane-enriched soluble oil of a stated composition can remain in the liquid phase without vaporization at a stated temperature.

Hence, in the practice of the invention a soluble oil is admixed with methane at an elevated pressure equal to or exceeding the saturation pressure, the methane being added in a proportion equal to or less than the bubble point composition at the reservoir pressure and temperature.

The invention is further described by the following examples which are illustrative of specific modes of practicing the invention and are not intended as limiting the scope of the invention as defined by the appended claims.

EXAMPLE 1

This example illustrates the viscosity reduction obtainable by enriching a soluble oil with methane. A first soluble oil composition (identified as soluble oil A) is prepared by admixing 72.0 volume percent of a 36.5° API Illinois crude oil, 6.5 volume percent of ethylene glycol monobutyl ether marketed by the Union Carbide Company under the trademark butyl Cellosolve solvent, and 21.5 volume percent of preferentially oil-soluble surface active alkyl aryl petroleum monosulfonates marketed by the Sonneborne Division of Witco Chemical Company, Inc. under the trademark Petronate CR. Petronate CR is an oil solution containing about 62 percent of mixed alkyl aryl sodium sulfonates having an average molecular weight in the range of about 490 to 510, and also contains up to about five percent water.

A second methane-enriched soluble oil (identified as soluble oil B) is prepared by admixing 68.4 volume percent of the Illinois crude oil, 6.5 volume percent of butyl Cellosolve solvent, and 21.5 volume percent of Petronate CR sulfonate. This composition is then enriched by the addition of 3.6 liquid volume percent of methane. The methane-enriched soluble oil is maintained at a pressure of 1,000 psig.

The viscosity of each soluble oil is measured by flowing under a fluid head, a measured volume of the soluble oil through a capillary restriction. Small increments of water are then added to each of the soluble oils and the viscosity of the resulting emulsion measured at each increment of water addition. These data are reported in Table 2 and graphically illustrated in FIG. 2. The reported viscosity data are the average of the readings obtained at the initial and final fluid head.

TABLE 2

| Soluble Oil A (No Added Methane) | | Soluble Oil B (3.6 Vol.% Added Methane) | |
|---|---|---|---|
| Vol.% Water Added | Viscosity at 76°F. & 0 psig, centistokes | Vol.% Water Added | Viscosity at 76°F. & 1000 psig, centistokes |
| 0 | 24.2 | 0 | 14.7 |
| 33.8 | 72.5 | 33.8 | 39.1 |
| 46.4 | 108 | 47.5 | 68.0 |
| 51.0 | 157 | 51.0 | 76.0 |
| 58.5 | 218 | 65.0 | 130 |
| 62.0 | 188 | 69.0 | 173 |
| | | 72.0 | 102 |

The peak viscosity is reduced from 218 centistokes to 173 centistokes by enrichment of the soluble oil with 3.6 volume percent methane. Also, it is observed that the peak viscosity occurs at a water content of about 69 volume percent with the methane-enriched soluble oil as contrasted with a peak viscosity at a water content of about 58.5 volume percent without methane enrichment. Thus, approximately 10 volume percent more water can be added to this methane-enriched soluble oil before inversion to an oil-in-water type emulsion.

EXAMPLE 2

This example illustrates the improved oil recovery obtainable by miscible flooding with a methane-enriched soluble oil. A soluble oil is prepared by admixing 45.5 volume percent of a Texas crude oil having a gravity of 38.5° API; 6.9 volume percent of Petronate CR petroleum sulfonate; 4.3 volume percent of a water-soluble mixed alkyl aryl petroleum sulfonate marketed by the Sonneborn Division of Witco Chemical Company, Inc. under the trademark Pyronate 30; 1.3 volume percent of butyl Cellosolve solvent; and 42.0 volume percent of water. Pyronate 30 is an aqueous solution containing 30 percent preferentially water soluble petroleum sulfonates having an average equivalent weight in the range of about 330 to 350.

A 1½-inch square Berea core 4 feet long is saturated with crude oil of the same type used in formulating the soluble oil, and then water flooded to residual oil saturation with brine. The core is then flooded by injecting in sequence 0.03 pore volume of an aqueous solution containing 0.05 weight percent of a partially hydrolyzed polyacrylamide marketed by the Dow Chemical Company under the trademark Pusher 700 polymer; 0.03 pore volume of the soluble oil; and 1.2 pore volume of an aqueous solution containining 0.15 weight percent of Pusher 700 polymer. The recovered oil is collected and its volume measured.

A second flooding test is conducted on a similar core that had been water flooded to residual oil saturation, using as the miscible displacement fluid the soluble oil prepared above enriched with 6.8 volume percent of methane, which is the saturation composition at 575 psig.

The results of these tests are reported in Table 3.

TABLE 3

RESULTS OF COMPARATIVE FLOODING TESTS

|  | Soluble Oil | Methane-Enriched Soluble Oil |
|---|---|---|
| Residual Oil Saturation, % of pore volume | 34.0 | 31.4 |
| Oil recovered after 1.27 pv of fluid injected, % of residual oil | 72.2 | 74.0 |

EXAMPLE 3

A miscible flooding operation is conducted in an oil-bearing reservoir in accordance with the method of this invention. Four injection wells are arranged in a generally rectangular pattern around a single centrally located production well. A substantially anhydrous soluble oil is prepared by admixing 74.3 volume percent crude oil, 19.6 volume percent of a mixture of preferentially oil-soluble and preferentially water-soluble surface active sulfonates containing about 48 percent of mixed alkyl aryl petroleum sulfonates, 1.9 volume percent of butyl Cellosolve solvent, and 4.0 volume percent water. The substantially anhydrous soluble oil is injected into the reservoir through the injection wells at well head injection pressures of about 1,200 to 1,500 psig and simultaneously therewith approximately 5.7 volume percent of methane is injected so that the substantially anhydrous soluble oil and the methane are mixed in the well. After about 200 barrels of methane-enriched soluble oil is injected into each injection well, this injection is interrupted and about 160 barrels of low salt-content water injected. These alternate injections are continued until a total of about 0.025 reservoir pore volume of methane-enriched soluble is injected. Thereafter, about 0.8 reservoir pore volume of aqueous polymer solution is injected into the reservoir through the injection wells to drive the previously injected fluids towards the central production well, from which oil is recovered. The water flood is completed by the injection of brine.

Various embodiments and modifications of this invention have been described in the foregoing description and examples, and further modifications will be apparent to those skilled in the art. Such modifications are included within the scope of this invention as defined by the following claims:

Having now described the invention, I claim:

1. In the method of recovering petroleum from a subterranean reservoir in which a miscible displacement fluid miscible with both the connate reservoir oil and with water is injected into the reservoir through an injection well, and thereafter an aqueous flooding medium is injected to drive the miscible displacement fluid towards a spaced production well from which fluids are recovered, the improvement which comprises employing as the miscible displacement fluid a soluble oil enriched with methane in an amount less than required to saturate the soluble oil with methane at the reservoir temperature and pressure.

2. The method defined in claim 1 wherein said soluble oil comprises an admixture of liquid hydrocarbon, surface active alkyl aryl sulfonates, and a stabilizing agent.

3. The method defined in claim 1 wherein said soluble oil comprises an admixture of about 45 to 90 volume percent of liquid hydrocarbon, 4 to 30 volume percent of surface active alkyl aryl sulfonates, and 0.5 to 8 volume percent of a stabilizing agent.

4. The method defined in claim 1 wherein said soluble oil contains water present in the form of a water-in-oil microemulsion.

5. The method defined in claim 1 wherein said soluble oil and a methane-containing gas are admixed at the surface at an elevated pressure equal to or exceeding the saturation pressure of said mixture to form said methane-enriched soluble oil, and wherein said methane-enriched soluble oil is thereafter injected into the reservoir in an amount equivalent to 0.01 to 0.15 pore volume.

6. The method defined in claim 1 wherein said soluble oil and a methane-containing gas are simultaneously injected into the well and admixed therein to form said methane-enriched soluble oil at an elevated pressure equal to or exceeding the saturation pressure.

7. The method defined in claim 1 wherein small slugs of said soluble oil and said methane are alternately injected through said well and into said reservoir at an elevated pressure equal to or exceeding the saturation pressure of the resulting methane-enriched soluble oil so as to form said methane-enriched soluble oil in the reservoir.

8. A method for recovering petroleum from a subterranean reservoir penetrated by an injection well and a production well spaced apart in the reservoir, which comprises:
preparing a soluble oil comprising an admixture of a liquid hydrocarbon having a viscosity above about 0.5 centipoises at 75° F., surface active alkyl aryl sulfonates, and a stabilizing agent;
simultaneously injecting through said injection well and into said reservoir about 0.01 to 0.15 pore volume of an admixture of said soluble oil and a gas containing at least about 90 mol percent methane at an elevated pressure equal to or exceeding the saturation pressure of the methane-enriched soluble oil, the methane content of said mixture being less than the saturation composition at the reservoir temperature and pressure;
thereafter injecting an aqueous flooding medium through said reservoir to drive said methane-enriched soluble oil towards said production well; and
recovering petroleum from said production well.

9. The method defined in claim 8 wherein said soluble oil contains water present in the form of a water-in-oil microemulsion.

10. The method defined in claim 8 wherein said soluble oil is substantially anhydrous and wherein small slugs of an admixture of said substantially anhydrous soluble oil and said methane-containing gas are alternately injected with small slugs of low salt-content water, the volume of said slugs of low salt-content water being not greater than the volume of the preceding slug of soluble oil.

11. The method defined in claim 8 wherein the proportion of methane in said methane-enriched soluble oil is adjusted to provide a desired mobility in said reservoir.

12. The method defined in claim 8 wherein said aqueous flooding medium is thickened by the addition of a small amount of a water-soluble polymer.

13. A method for recovering petroleum from a subterranean reservoir penetrated by an injection well and a production well spaced apart in the reservoir, which comprises:

preparing a substantially anhydrous soluble oil comprising an admixture of 45 to 90 volume percent of crude petroleum, 0.5 to 8 volume percent of a partially oxygenated organic liquid stabilizing agent, 4 to 30 volume percent of a mixture of preferentially oil-soluble surface active alkyl aryl sulfonates and preferentially water-soluble alkyl aryl sulfonates, said surface active agents being present in the proportion of about 1 to 15 parts of preferentially oil-soluble sulfonates per part of said preferentially water-soluble sulfonates;

simultaneously injecting through said injection well and into said reservoir a series of small slugs of said soluble oil and a gas containing at least about 90 mol percent methane at an elevated pressure whereby said methane is dissolved in said soluble oil to form a methane-enriched soluble oil, the methane content of said methane-enriched soluble oil being less than the saturation composition at reservoir conditions of temperature and pressure, and said small slugs of said simultaneously injected soluble oil and methane being alternately injected with small slugs of low salt-content water, the volume of said small slugs of low salt-content water being not greater than the volume of said preceding slug of methane-enriched soluble oil, and the combined volume of said slugs of methane-enriched soluble oil and water amounting to about 0.01 to 0.15 reservoir pore volume;

next injecting 0.1 to 0.8 reservoir pore volume of an aqueous flooding medium thickened by the addition of a small amount of a water-soluble polymer;

thereafter injecting water or brine to drive said fluids towards said production well; and recovering petroleum from said production well.

* * * * *